(12) United States Patent
Au et al.

(10) Patent No.: US 7,110,670 B1
(45) Date of Patent: Sep. 19, 2006

(54) DISTRIBUTED PHOTONIC SWITCH AND OPTICAL UNI SERVER

(75) Inventors: How Kee Au, Ottawa (CA); Guoqiang G. Q. Wang, Ottawa (CA); Kent E. Felske, Kanata (CA); Stanislus K. Xavier, Kanata (CA)

(73) Assignee: Nortel Networks Limited, St. Laurent ( * ) Notice: Subject to any disclaimer, the term of this patent is extended or adjusted under 35 U.S.C. 154(b) by 793 days.

(21) Appl. No.: 09/972,911

(22) Filed: Oct. 10, 2001

Related U.S. Application Data (60) Provisional application No. 60/279,989, filed on Mar. 30, 2001.

(51) Int. Cl.
*H04J 14/00* (2006.01)

(52) U.S. Cl. .............................. 398/48; 398/51; 398/57

(58) Field of Classification Search ................. 398/45, 398/48, 50, 51, 55, 56, 57
See application file for complete search history.

(56) References Cited

OTHER PUBLICATIONS

"IP Over Optical"; Chris Metz; IEEE Internet Computing, Nov.-Dec. 2000; http://www.cisco.com/warp/public/779/servpro/solutions/optical/docs/ip_optical2-01.pdf.*
"Signalling Requirements at the Optical UNI"; Zhang et al.; Internet Draft, Jul. 14, 2000; http://www.cse.ohio-state.edu/~jain/ietf/ftp/draft-bala-mpls-optical-uni-signaling-00.txt.*
"IP over optical networks; architectural aspects"; Rajagopalan et al.; IEEE Communications Magazine, vol. 38, Issue 9, Sep. 2000; pp. 94-102.*
D. Brungard, "Requirements for Generalized MPLS (GMPLS) Routing for Automatically Switched Optical Network (ASON)", http://www.ietf.org/internet-drafts/draft-ietf-ccamp-gmpls-ason-routing-reqts-05.txt, Oct. 2004.
O. Gerstel, et al. "Optical Layer Survivability: an Implementation Perspective", IEEE Journal on Selected Areas in Communications, vol. 18, No. 10, Oct. 2000, pp. 1885-1899.
L. Berger, "Generalized Multi-Protocol Label Switching (GMPLS) Signaling Functional Description," http://www.ietf.org/rfc/rfc3471.txt, Jan. 2003.
M. Mayer, "First Draft of Gason," Contribution to T1 Standards Projects, T1X1.5/2000-128, Mar. 2000.
M. Mayer, "Further Discussion of Requirements for Automatically Switched Optical Channel Networks<" Contribution to T1 Standards Project, t1X1.5/2000-32m Jan. 2000.

(Continued)

*Primary Examiner*—Leslie Pascal
*Assistant Examiner*—Nathan Curs
(74) *Attorney, Agent, or Firm*—Hunton & Williams LLP (57) ABSTRACT

A technique for establishing automatic service connectivity in a network between multiple network elements is disclosed. Each network element utilizes routing and distribution protocols to discover its neighbors and establish a topology. Optical fibers connect the network elements. Each optical fiber carries multiple wavelengths of signals, wherein the network elements communicate with a server. The method comprises: storing information pertaining to each of the network elements at the server; registering network elements by collecting information about each network element; receiving a connectivity request from a first registered node for connection with a second registered node; determining compatibility of the first and second registered node; and instructing network elements upon verifying compatibility to search for an end-to-end wavelength path and establish a connection between the first registered node and the second registered node.

26 Claims, 6 Drawing Sheets

OTHER PUBLICATIONS

R. Ramaswami, et al. "Optical Networks: A Practical Perspective", Morgan Kaufmann Publishers, Inc. San Francisco, CA, http://www.e-tba.com/books/optical-networks-practical-perspective.htm, Oct. 15, 2001.

J. Lang, et al. "Link Management Protocol (LMP)", IEFT draft draft-lang-mpls-lmp-02.txt, ftp://ftp.isi.edu/internet-drafts/draft-ietf-ccamp-imp-10.txt, Oct. 2003.

D. Griffith, "A Comparison of RSVP-TE and CR-LDP", Optical Internetworking Forum (OIF) contribution OIF2000.179, Aug. 2000.

P. Brittain et al., "MPLS Traffic Engineering: A Choice of Signaling Protocols", white paper of Data Connection Limited, http://www.dataconnections.com, Jan. 2000.

E. Rosen, et al. "Multiprotocol Label Switching Architecture", IETF RFC 3031, http://www.ietf.org/rfc/rfc3031.text?number=3031, Jan. 2001.

L. Andersson, et al. "LDP Specification", IETF RFC 3036, http://www.ieft.org/rfc/rfc3036.tex?number=3036, Jan. 2001.

D. Awduche, et al. "Requirements for Traffic Engineering Over MPLS", IETF RFC 2072, http://www.ietf.org/rfc/rfc2072.txt?number=2702, Sep. 1999.

B. Jamoussi, et al. "Constraint-Based LSP Setup Using LDP", IETF draft draft-ietf-mpls-cr-ldp-04.txt, http://www.ietf.org/rfc/rfc3212.txt?number=3212, Jul. 2002.

Y. Fan et al., "Extensions to CR-LDP and RSVP-TE for Optical Path Set-up" draft-fan-mpls-lambda-signaling-00.txt, IETF Draft, Mar. 2000.

E. Mannie, "Generalized Multi-Protocol Label Switching (GMPLS) Architecture," IETF Draft, http://www.ieft.org/rfc/rfc3945.txt?number=3945, Oct. 2004.

User Network Interface (UNI) 1.0 Signaling Specification, The Optical Internetworking Forum, 2001.

G. Wang, et al., "Extensions to OSPF/IS-IS for Optical Routing", draft-wang-isis-lambda-te-routing-00.txt, Mar. 2000.

Draft ITU-T Recommendation G.872, "Architecture of Optical Transport Networks," Series G: Transmission Systems and Media, Digital Systems and Networks, Digital Networks—Optical Transport Networks, Nov. 2001.

C. Wright, "User Network Interface (UNI) 1.0 Interoperability Test Plan", Internet Draft, "OIF2001.081", Jan. 2001.

P. Ashwood-Smith, "Generalized Multi-Protocol Label Switching (GMPLS) Signaling Constraint-based Routed Label Distribution Protoco (CR-LDP) Extensions", The Internet Society, http://www.ietf.org/rfc/rfc3472.txt, Jan. 2003.

J. Ash, "LSP Modification Using CR-LDP", The Internet Society, http://www.ietf.org/rfc/rfc3214.txt, Jan. 2002.

B. Fox, "Virtual Private Networks Identifier," The Internet Society, http://www.faqs.org/rfcs/rfc2685.html, Sep. 1999.

Draft_routing_isis.txt.

* cited by examiner

DISTRIBUTED PHOTONIC SWITCH AND OPTICAL UNI SERVER

CONTINUING DATA

This application claims priority from provisional application Ser. No. 60/279,989, filed on Mar. 30, 2001.

FIELD OF THE INVENTION

The present invention relates generally to a method and system for creating a distributed switch and more particularly, to a technique for implementing a novel virtual photonics switch having switching components with an optical server that are distributed over a wide area.

BACKGROUND OF THE INVENTION

In the present state of the art, the development of a photonics network is in its infancy. Currently, service requests from peripheral nodes in a network are directed to the service administration of a network service provider. The establishment of service connectivity is therefore not automatic and is labor intensive and time consuming.

As a photonics cross-connect network element is being developed, the various concepts of utilizing such network elements in a photonics network are also being investigated. One approach that is currently being proposed to exploit the high bandwidths in such a network is to use an IP core router in the network such that any edge router can utilize the wavelength connectivity to establish a link between the routers. In effect, this approach is simply to use the network to transport IP traffic to the core router.

A problem with the above-described approach is that the initial connection may require human intervention. Another shortcoming is that other services rely on a core router for support. For example, a virtual private network can be established but is dependent on the core router for service availability and security. Indeed, the deployment of future services is dependent on the existence of a core router.

In view of the foregoing, it would be desirable to provide a technique for providing automatic service connectivity. More particularly, it would be desirable to provide a technique for efficiently providing service connectivity between network elements in an efficient and cost effective manner distributed through a client-server architecture.

SUMMARY OF THE INVENTION

According to the present invention, a technique is provided for establishing automatic service connectivity between network elements.

In one embodiment, the technique is realized by a virtual photonics switching system. The virtual photonics switching system comprises multiple photonics cross-connect network elements, each of said network elements utilizing routing and distribution protocols to discover its neighbors and establish a topology. The virtual photonics switching system additionally comprises optical fibers connecting the network elements, each optical fiber carrying multiple wavelengths of signals. The virtual photonics switching system also includes an Optical User to Network Interface (O-UNI) server. The O-UNI server comprises a storage mechanism for storing information pertaining to the network elements, and a registration mechanism for facilitating registration of user nodes, wherein the registration mechanism collects information pertaining to a user node. The O-UNI server additionally comprises a connecting mechanism for accepting a connectivity request from a first registered node for connection with a second registered node and a compatibility determination mechanism for determining compatibility of the first and second registered nodes. The O-UNI server additionally includes instructional tools for providing instructions to the network elements upon verifying compatibility for locating an end-to-end wavelength path and establishing a connection between the first registered node and the second registered node.

In accordance with other aspects of the present invention, a method is provided for establishing automatic service connectivity in a network between multiple network elements. Each of the network elements utilizes routing and distribution protocols to discover its neighbors and establish a topology. Optical fibers connect the network elements and each optical fiber carries multiple wavelengths of signals. The network elements communicate with a server. The method comprises the steps of: storing information pertaining to each of said network elements at the server; registering network elements by collecting information about each network element; receiving a connectivity request from a first registered node for connection with a second registered node; determining compatibility of the first and second registered nodes; and instructing network elements upon verifying compatibility to search for an end-to-end wavelength path and establish a connection between the first registered node and the second registered node.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
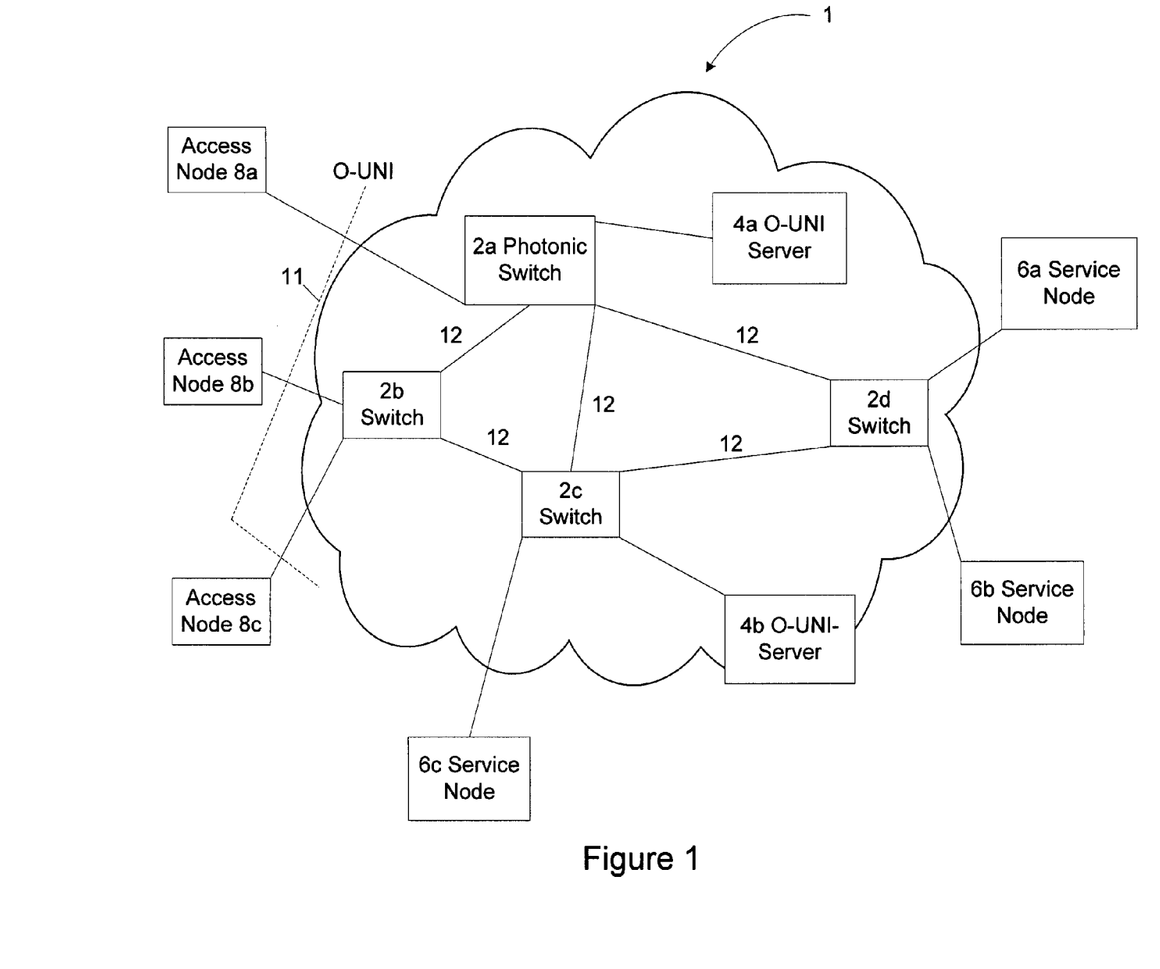
FIG. 1 is a block diagram illustrating an embodiment of a photonics network of the invention.

Referring to FIG. 1, there is shown a block diagram illustrating a photonics network 1 of an embodiment of the invention. A plurality of photonics cross-connect network elements 2a–d, 4a, 4b, 6a–c, 8a–c are first inter-connected to form a dense wavelength division multiplexing (DWDM) network. DWDM is an optical technology that is used to increase bandwidth over existing fiber optic backbones. DWDM operates by combining and transmitting multiple signals simultaneously at different wavelengths on the same fiber. Each network element utilizes standardized routing and distribution protocols to discover its neighbors and thus establishes a topology of the network.

As shown in FIG. 1, the photonics network 1 includes network elements such as photonic switches (PSs) 2a, 2b, 2c, 2d, service nodes 6a, 6b, 6c, access nodes 8a, 8b, 8c, an optical user-to-network interface (O-UNI) 11, and O-UNI servers 4a, 4b. The servers 4a, 4b are examples of a centralized server system. The same server system may be implemented as a distributed system whereby the functions are distributed among the PSs. Each network element is further described below.

The PSs 2a, 2b, 2c, 2d are generic network elements defined as optical cross connects that support the cross-connection of the constituent wavelengths in the multi-wavelength signals. The PSs 2a, 2b, 2c, 2d are either incapable of wavelength conversion or capable of wavelength conversion on all signal paths simultaneously.

O-UNI servers 4a, 4b are network elements that are responsible for storing characteristics information on external nodes and processing all information associated with O-UNI transactions. The O-UNI network servers 4a, 4b support a web menu to advertise all services available, accessible by any user in search of a new service provider.

Access nodes 8a, 8b, 8c are network elements which enable the service subscribers to access the services provided by the service nodes 6a, 6b, 6c. The access nodes 8a, 8b, 8c can be multiplexers or edge routers, for example.

Service nodes 6a, 6b, 6c are network elements which support services to subscribers. The service nodes 6a, 6b, 6c can be a core routers or video servers or any other appropriate element.

All PSs 2a, 2b, 2c, 2d exchange control messages with their peers via an out-of-band communication channel, known as an optical supervisory channel (OSC). The access nodes 8a, 8b, 8c and the service nodes 6a, 6c, 6b also use the same channel to exchange control information with the O-UNI server 4a, 4b.

The photonics network 1 is formed by the interconnection of ID PSs 2a, 2b, 2c, 2d by means of optical fibers 12, each of which carries multiple wavelengths. A main function of the photonics network 1 is to support the data transfer between the access nodes 8a, 8b, 8c and service nodes 6a, 6b, 6c.

When the PSs 2a, 2b, 2c, 2d are interconnected to form the photonics network 1, each PS 2a, 2b, 2c, 2d utilizes wavelength routing protocol (WRP) and wavelength distribution protocol (WDP) to discover its neighbors and exchange information on the characteristics of its peers, thereby discovering the topology of the network and the bandwidth in the links connected to its neighbors. Additionally, the PSs 2a, 2b, 2c, 2d utilize optical link management protocol (OLMP) to manage the interconnecting links. Any link failure may be automatically protected by the K-diversity line protection schema as disclosed in co-pending U.S. patent application Ser. No. 09/703,715, which is hereby incorporated by reference.

Figure 2:
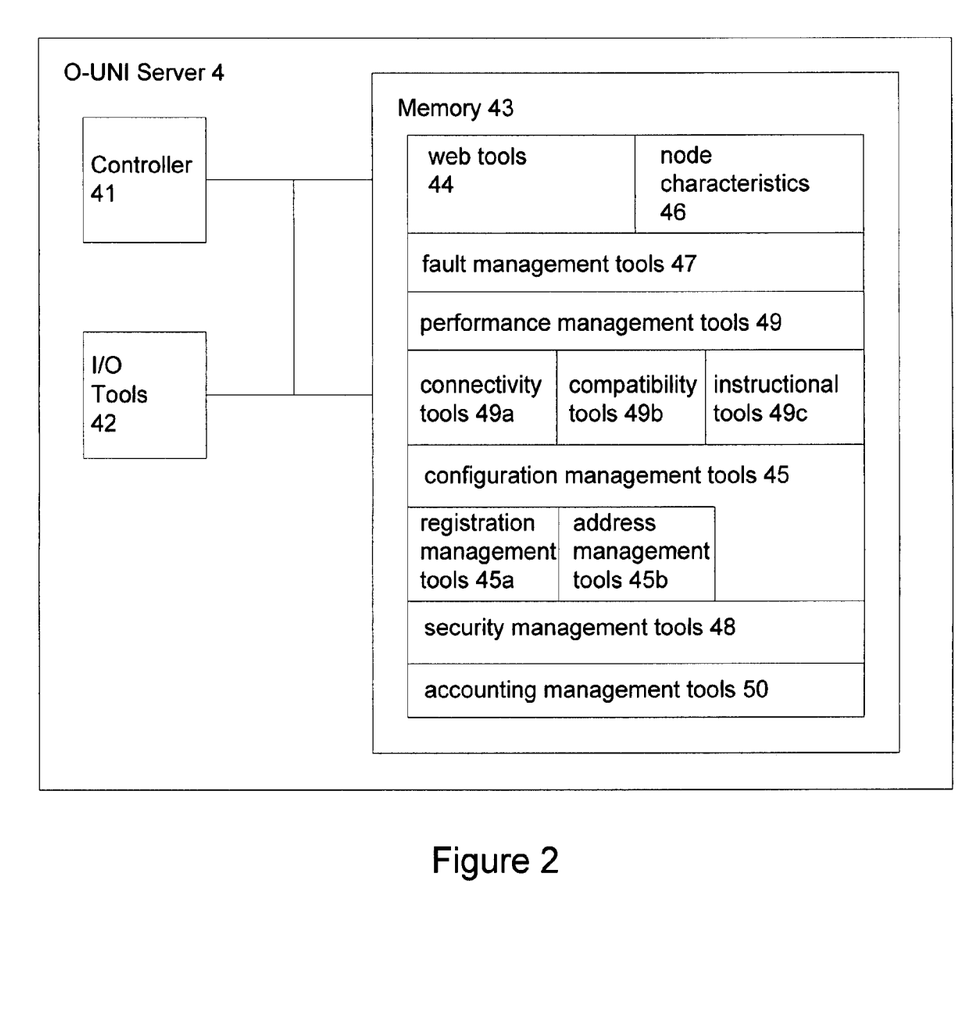
FIG. 2 is a block diagram illustrating an embodiment of an O-UNI server of the invention.

FIG. 2 shows an O-UNI server 4 of the invention in greater detail. The O-UNI server 4 may be computer or device on a network that manages network resources. Servers are often dedicated, meaning that they perform no other tasks besides their server tasks. On multiprocessing operating systems, however, a single computer can execute several programs at once. A server in this case could refer to the program that is managing resources rather than an entire computer. The O-UNI server 4 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

In the embodiment shown in FIG. 2, the O-UNI server 4 may include a controller 41, Input/Output (I/O) tools 42, and a memory 43.

The controller 41 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control.

The memory 43 may include electronic memory such as RAM (random access memory) or EPROM (electronically programmable read only memory), storage such as a hard-drive, CDROM or rewritable CDROM or other magnetic, optical or other media, and other associated components connected over an electronic bus, as will be appreciated by persons skilled in the art.

The memory 43 of the O-UNI server 4 may store web tools 44, node characteristics 46, fault management tools 47, configuration management tools 48, and performance management tools 49, security management tools 48, and accounting management tools 50.

The web tools 44 preferably provide a web menu for listing available services accessible to users. The configuration management tools 45 may accept information from peripheral users intending to register as network components and determine when a node can be added or dropped from the network. The configuration management tools 45 may include registration tools 45a for registering nodes and address management tools 45b for address resolution and assignment. The node characteristics storage area 46 stores information collected by the registration tools 45. The performance management tools 49 manage connection requests and may include compatibility determination tools 49a, connectivity tools 49b, and instructional tools 49c. These tools receive a connectivity request, determine node compatibility, and provide the nodes with instructions for establishing an end-to-end path. The fault management tools 47 determine when an error has occurred in establishing a connection. The security management tools 48 manage the allocation and authentication of access passwords of the nodes at registration time and at service time. The accounting management tools 50 manage the data associated with service usage, such as bandwidth holding time, for billing purposes.

An external node can request to be connected to another node in the network by sending a control message to the O-UNI server 4 identifying its peer node, the bandwidth required and other associated parameters, via the O-UNI, using an optical bandwidth control protocol (OBCP). The performance management tools 49 of the O-UNI server 4 will verify the technology and bandwidth compatibilities of the nodes based on the node characteristics 46 and it will command the PSs 2a, 2b, 2c, 2d under its jurisdiction to establish the optical connection, if the permission is granted.

The connection and disconnection between the external nodes are user initiated, subject to the approval of the O-UNI server 4. The network 1 maintains the connectivity with the highest grade of service availability.

Referring again to FIG. 1, dynamic service provisioning can be activated by the user. For example, the access node 8b can select the connection to any external node in the network 1 provided that the appropriate O-UNI server 4a, 4b gives permission. The service node 6c may be a core router while the service node 6a may be a multiprotocol label switching (MPLS) edge router. Thus, the access node 8b can select its own 'Home' router at any time, similarly to present day long distance carriers.

If the access node 8b supports more than one access wavelength in the DWDM environment, it can be connected to multiple routers, if required.

In one network embodiment, the optical path connecting any two access nodes 8a, 8b, 8c can be configured and activated by the user or be dynamically configured and activated by user's request to the O-UNI server 4a, 4b.

As dynamic service provisioning can be activated by the user, an access node 8b can select the connection to any access node registered with the O-UNI server 4a, 4b. The server node 6c may be a core router while the service node 6a may be an MPLS edge router.

Figure 3:
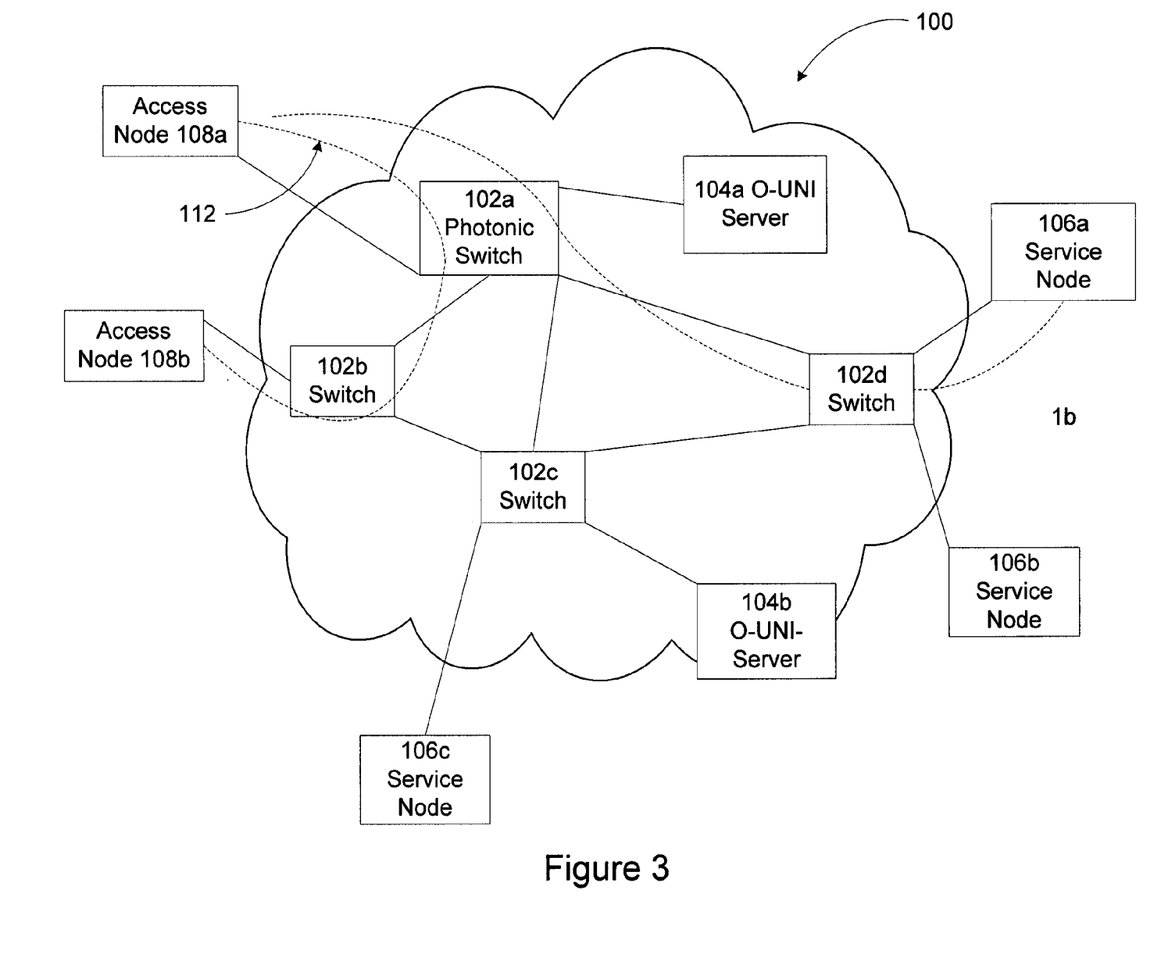
FIG. 3 is a block diagram illustrating an embodiment of a protocol agnostic private network.

FIG. 3 shows a protocol agnostic private network. An access node 108b can select the connectivity to any other node, subject to approval of an O-UNI server 104a, 104b. As such, if the access node 108b and an access node 108a belong to the same corporation in a different part of a selected area, the access nodes 108a and 108b can be inter-connected by a photonics network 100, thus forming a truly private network connection 112. This concept can be extended to more than two nodes. The photonics network 100 simply provides a carrier grade protocol agnostic photonic paths. The inter-working between nodes is in the jurisdiction of the user domain. In other words, communication between the access nodes 108a and 108b does not require the intervention of a core router or the establishment of a traditional virtual private network.

The photonics network 100 shown in FIG. 3 can transport data with any protocol. The photonics network 100 can transport SONET, ATM etc. provided the end-to-end nodes use the same communication protocol as verified by the O-UNI Server 104a, 104b.

If the access node 108a also has an IP connection to the service node core router 106a, the corporation may also be connected to the Internet Domain.

Figure 4:
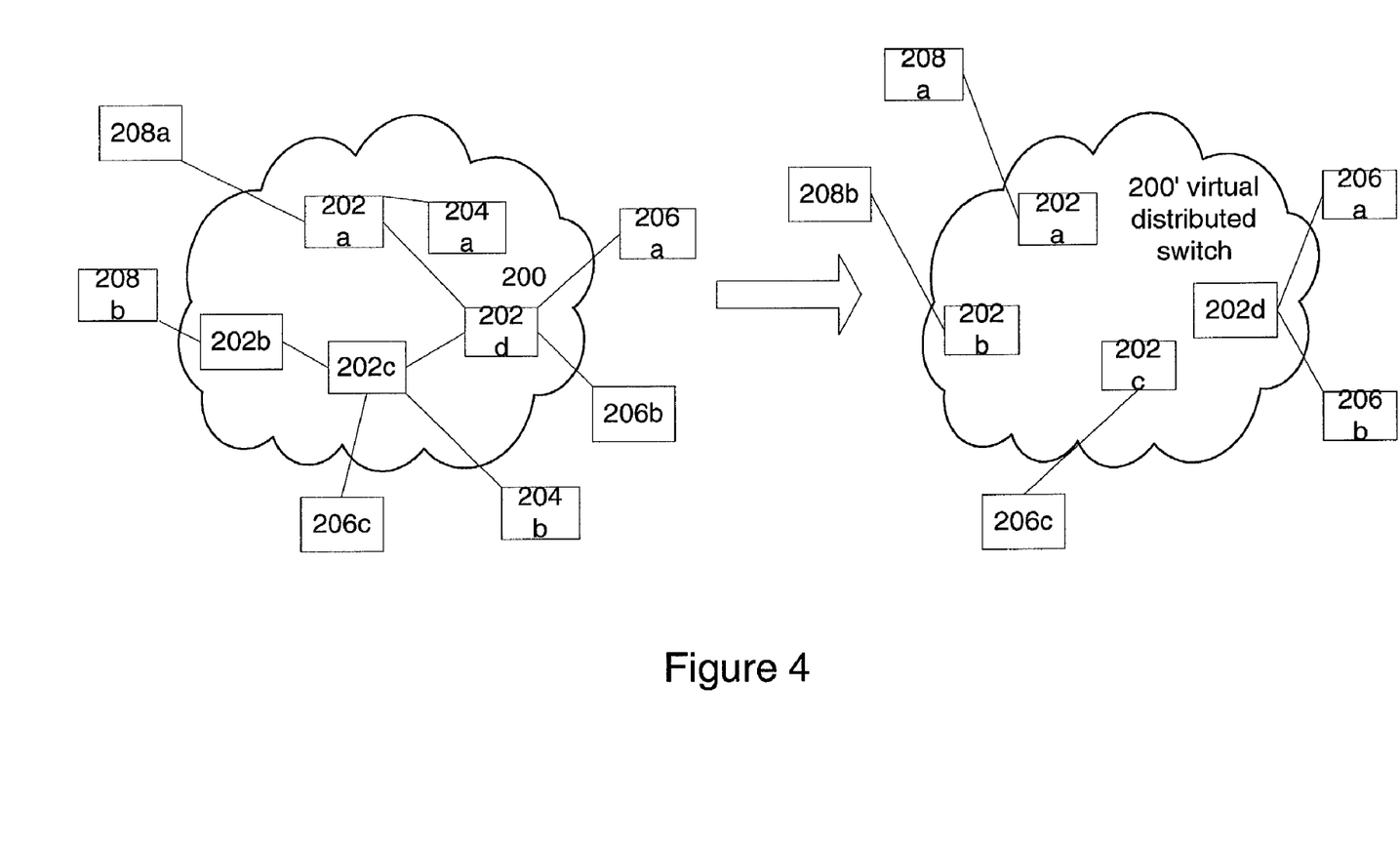
FIG. 4 is a block diagram showing the use of a photonics network as a virtual distributed switch.

FIG. 4 shows the use of a network 200 as a virtual distributed switch 200'. As shown in FIG. 4, the ports of all the PSs 202a, 202b, 202c, 202d in the network 200 accessible by the external access nodes 208a, 208b, 208c can form the I/O ports of a virtual photonics switch 200' that may be distributed over hundreds of kilometers. The O-UNI Servers 204a, 204b form a central control of the distributed switch, with which all access nodes 208a, 208b, 208c are registered. Each external access node 208a, 208b, 208c sends a request to the O-UNI server 204a, 204b for a connection to another node. If the permission is granted, the O-UNI server 204a, 204b will initiate the photonics path connection between the end nodes. The nodes can similarly request a disconnection. The O-UNI server 204a, 204b will follow the instructions accordingly. The bandwidth usage is always registered. Accordingly, the virtual distributed switch with DWDM ports can be deployed for a selected extensive area such as an entire metropolitan area. This virtual distributed switch 200' can support networks such as IP, private, SONET, ATM and others.

Each network element can communicate with its peers to acquire the knowledge of link status and the wavelengths status of the complete network, if necessary. Protection algorithms exist in the system to protect the network from link failures. Each peripheral node that is connected to the network can communicate with some network intelligence which can be centralized or distributed in the network, via a standardized optical user network interface (O-UNI). The O-UNI server 204a, 204b functions as the network intelligence. The O-UNI server 204a, 204b has the knowledge of all the photonics network element characteristics under its jurisdiction as well as the topology of the network.

As set forth above with respect to FIG. 2, the management functions of the O-UNI server 4 may include configuration management, fault management, performance management, security management, and accounting management. Configuration management refers to the registration and recognition of peripheral nodes as described above. Fault management refers to detecting failures and sending an error notification. Performance monitoring refers to verifying that signals are sent as instructed and that the signal integrity is adequate. Security management refers to maintaining service access security. Accounting management refers to the maintenance of data associated with billing.

Figure 5:
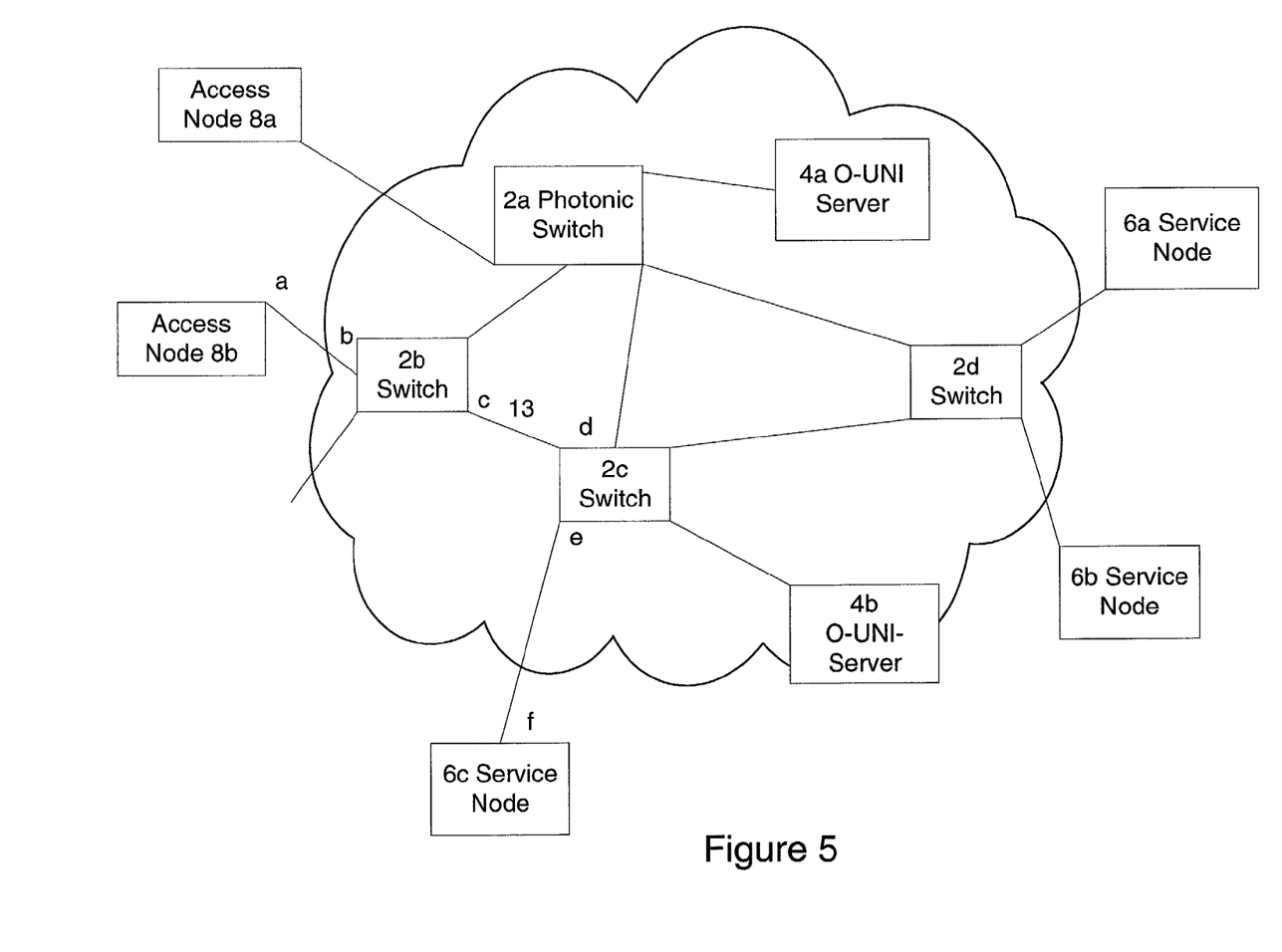
FIG. 5 is a block diagram illustrating performance monitoring and fault management mechanisms.

With reference to FIG. 5, an optical path 13 is provided from the access node 8b to service node 6c. In each of PS 2b and PS 2c in the optical path, the optical signal between ports b and c in PS 2b or between ports d and e in PS 2c may be verified by fault management tools 47. If a transmission problem occurs, PS 2c and/or PS 2b may send an error message. The performance management tools 49 may operate at the same or different points along the optical path as the fault management tools and may be provided at the end points or at all points along the path.

Bandwidth utilization data may be stored in the O-UNI server or in each PS or both. The PS should also include a mechanism for verifying signal integrity.

The above concept illustrates that the photonic path can transport data with any protocol. It can transport SONET, ATM, etc. provided the end-to-end nodes use the same communication protocol.

Figure 6:
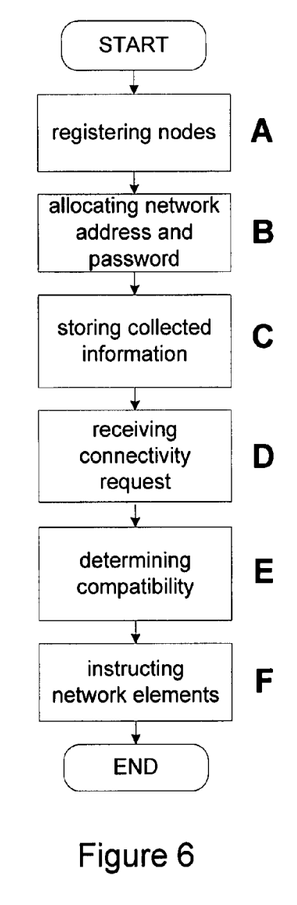
FIG. 6 is a flow chart illustrating a method of the invention.

FIG. 6 is a flow chart broadly illustrating a method of the invention. When a peripheral node is connected to the network for the first time, it will register with the appropriate O-UNI network server in step A to submit its registration describing its characteristics. After registration, the address management tools 45b and the security management tools 48 of the O-UNI server will allocate a network address and an access password for each newly registered peripheral node in step B. In step C, the O-UNI server stores the characteristics collected in step A, which may include a number of ports, wavelengths per port, bandwidth per wavelength, and technology support. Examples of technology support include IP over Ethernet, IP over synchronous optical network (SONET), or asynchronous transfer mode (ATM). Once a peripheral node is registered, it can request connectivity to any service node that is connected to the system. The O-UNI server receives the connectivity request in step D. Upon receipt of a user request in step D, the O-UNI network server will conduct address resolution, authenticate the access password, and verify the technology compatibility of the communicating nodes in step E, such as ATM compatibility, bandwidth compatibility etc. If the requirements of the nodes are compatible, the O-UNI network server will send instructions in step F to all the photonics network elements to search for an end-to-end wavelength path and eventually to establish the link. The O-UNI network server communicates this information to the nodes at the ends of the paths, and the nodes can thus begin their data communications.

The de-activation of the path follows the same principle where either user can send a disconnect message to the O-UNI network server which in turn will instruct the photonics network elements to remove the connection. The users are informed of the process. Billing may be assessed according to the bandwidth holding time or other tariff agreements.

As an example of an additional service, in an embodiment of the invention, an access node, which may be a multiplexer for example, may support more than one wavelength connectivity to a destination router and it may require only one wavelength for normal operation. The node may have the intelligence to detect if the bandwidth within the single wavelength is approaching full utilization. An increase from normal usage may necessitate a request for greater bandwidth from the O-UNI server automatically. If the bandwidth is available to supplement the existing connection, the O-UNI server will grant the request and inform the node to proceed to utilize an additional wavelength which has been made available. The multiplexer can request bandwidth from the O-UNI server with out local intervention. A multiplexer may have the intelligence to detect if a subscriber at one of its ports has requested an increase of bandwidth. The port may support up to 100 Mbps, whereas the subscriber normally only uses 10 Mbps. An increase from normal usage may necessitate a request for greater bandwidth. Normal usage may increase when additional users subscribe. The multiplexer will verify the available bandwidth upstream. If necessary the multiplexer will request more bandwidth from the O-UNI server automatically. If the bandwidth is available and is granted by the O-UNI server, the O-UNI server will inform the subscriber to proceed. The MUX can request bandwidth from the O-UNI server without local intervention.

The distributed switch is composed of a number of photonics cross-connect network elements located in various parts of a selected area. These network elements are interconnected by means of optical fibers, each of which carries multiple wavelengths of signals. The interconnection of the network elements also establishes a photonics network with switching capabilities. This composite switch is capable of switching wavelengths carrying high bandwidth of data from a peripheral node at one edge of the network to another at the other edge of the network, and is therefore a distributed switch. The distributed switch enables a subscriber to obtain a high bandwidth wavelength on demand and to switch and transport high bandwidth signals between nodes with compatible technology, irrespective of their signal protocols. The nodes may include routers, ATM switches, SONET transport rings, or linear systems.

The distributed switch further enables a subscriber node to request bandwidth and activate or deactivate a connection with its peers across the network without the intervention of the network administration and enables a subscriber node to utilize the wavelengths of the network at its disposal to create any type of virtual networks associated with its peers to meet its own service requirements. The distributed switch may operate across a metro area that can be configured by the user to support a variety of high bandwidth services. The network service providers will obtain a transport product with switching capabilities to support high bandwidth services at a low cost, and that allows almost instantaneous service activation/deactivation by the subscriber. The distributed switch supports interconnections of high capacity networks such as IP networks, SONET networks, ATM networks, optical LANs/WANs. The distributed switch further supports protocol transparency in connections, subscribers' choice of service providers, dynamic provisioning of service by subscribers. The distributed switch can also be used to support an optical virtual private network, which may offer subscribers' choice of private network configuration, multicast service, carrier grade availability, carrier grade security, and scalability.

With regard to data transport, the network is transparent to the data. However, in the domain of control and management of such a network, each node in the network must be opaque as control and management information can only be exchanged electronically.

In summary, the switch of the invention may be distributed over a wide metropolitan area that may span hundreds of kilometers. The switch is protocol transparent and only connects technology and protocol compatible nodes. Connectivity and disconnected are user activated. The switch can emulate a private network and can be imitated. The connectivity is of carrier grade.

The approach disclosed herewith enables a subscriber or any service provider to register its peripheral node to the network intelligence, whereby, in the IP web based environment, a service provider can advertise its services while the subscriber can select the provider that meets its service and operating requirements. Deployment can be established almost instantaneously with the service request. The distributed switch may be considered to operate in a similar fashion to the ubiquitous voice switch of today where service can be accessed on demand.

In the distributed switch approach described herein, all services can co-exist. While the edge router and its home core router are in operation, other IP based networks that need to establish a separate virtual private network, completely detached from the existing IP network, can do so by sending a request to the distributed switch to set up connections to form a separate private network across a predetermined area with carrier grade availability and security. This network can be set up or dismantled without human intervention. Additionally, this private network can also be TDM based or ATM based since the distributed switch is protocol agnostic.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A virtual photonics switching system comprising:
   multiple photonics network elements comprising photonics network nodes and photonics network switches;
   optical fibers connecting the photonics network elements; and
   an O-UNI server optically connected to at least one of the photonics network elements including:
      at least one memory for storing information pertaining to photonics network nodes registered with the O-UNI server;

a communication circuit for receiving a connectivity request from a first registered photonics network node for a connection with a second registered photonics network node; and connection logic for determining compatibility of the first and second registered photonics network nodes;

the communications circuit providing instructions to photonics network switches upon verifying compatibility of the first and second registered photonics network nodes to search for an end-to-end wavelength path and establish the connection between the first registered photonics network node and the second registered photonic network node.

2. The system of claim 1, wherein the O-UNI server further comprises a web menu for providing a user with a selection of available services.

3. The system of claim 1, wherein the connection logic determines technology compatibility.

4. The system of claim 1, wherein the photonics network nodes include photonics network service nodes and photonics network access nodes.

5. The system of claim 4, wherein the photonics network service nodes comprise core routers or video servers.

6. The system of claim 4, wherein the photonics network access nodes comprise multiplexers or edge routers.

7. The system of claim 1, wherein the O-UNI server further comprises fault management tools for determining when an error has occurred in establishing the connection.

8. The system of claim 1, wherein the photonics network elements, the optical fibers, and the O-UNI server comprise a protocol agnostic private network, provided that communicating photonics network nodes use an identical communication protocol.

9. The system of claim 1, wherein the O-UNI server further comprises registration tools for registering photonics network nodes and collecting information including number of ports, wavelengths per port, and bandwidth per wavelength.

10. A method for establishing automatic service connectivity in a network between multiple photonics network elements comprising photonics network nodes and photonics network switches connected by optical fibers, each optical fiber carrying multiple wavelengths of signals, wherein the photonics network elements optically communicate with an O-UNI server, the method comprising:

registering photonics network nodes at the O-UNI server by collecting information about each photonics network node;

storing information pertaining to each registered photonics network node at the O-UNI server;

receiving a connectivity request at the O-UNI server from a first registered photonics network node for a connection with a second registered photonics network node;

determining compatibility of the first and second registered photonics network nodes at the O-UNI server; and instructing photonics network switches from the O-UNI server upon verifying compatibility of the first and second registered photonics network nodes to search for an end-to-end wavelength path and establish the connection between the first registered photonics network node and the second registered photonics network node.

11. The method of claim 10, further comprising providing the O-UNI server with A web menu for providing a user with a selection of available services.

12. The method of claim 10, wherein the step of determining compatibility comprises determining technology compatibility.

13. The method of claim 10, further comprising using photonics network service nodes and photonics network access nodes as the photonics network nodes.

14. The method of claim 13, further comprising providing core routers or video servers as photonics network service nodes.

15. The method of claim 13, further comprising providing multiplexers or edge routers as photonics network access nodes.

16. The method of claim 10, further comprising performing fault management for determining when an error has occurred in establishing the connection.

17. The method of claim 10, further comprising forming a protocol agnostic private network provided that communicating photonics network nodes use an identical communication protocol.

18. The method of claim 10, wherein the step of registering photonics network nodes comprises collecting information including number of ports, wavelengths per port, and bandwidth per wavelength.

19. An O-UNI server adaptable for use in a virtual photonics switching system having a plurality of photonics network elements comprising photonics network nodes and photonics network switches, the O-UNI server comprising:

at least one memory for storing information pertaining to each photonics network node registered with the O-UNI server;

a communication circuit for receiving a connectivity request from a first registered photonics network node for a connection with a second registered photonics network node; and connection logic for determining compatibility of the first and second registered photonics network nodes;

the communications circuit providing instructions to photonics network switches upon verifying compatibility of the first and second registered photonics network nodes to search for an end-to-end wavelength path and establish the connection between the first registered photonics network node and the second registered photonics network node.

20. The O-UNI server of claim 19, further comprising a web menu for providing a user with a selection of available services.

21. The O-UNI server of claim 19, wherein the connection logic determines technology compatibility.

22. The O-UNI server of claim 19, further comprising fault management tools for determining when an error has occurred in establishing the connection.

23. The O-UNI server of claim 19, further comprising registration tools for registering photonics network nodes and collecting information including number of ports, wavelengths per port, and bandwidth per wavelength.

24. The O-UNI server of claim 19, further comprising address management tools for address resolution and assignment.

25. The O-UNI server of claim 19, further comprising accounting management tools for managing data associated with service usage.

26. The O-UNI server of claim 19, further comprising security management tools for managing allocation and authentication of access passwords of the photonics network nodes.

* * * * *